United States Patent [19]
Muranaka

[11] 3,775,086
[45] Nov. 27, 1973

[54] DEVICE FOR DETACHABLY SUPPORTING GLASS BULB MOLDS

[75] Inventor: Tsueno Muranaka, Chigasaki, Japan

[73] Assignee: Tokyo Shibaura Denki Kabushiki Kaisha, Kawasaki-shi Kanagawa-ken, Japan

[22] Filed: Oct. 21, 1971

[21] Appl. No.: 191,232

Related U.S. Application Data

[63] Continuation-in-part of Ser. No. 839,397, July 7, 1969, abandoned.

[30] Foreign Application Priority Data
July 20, 1968   Japan.............................. 43/50906

[52] U.S. Cl........................ 65/323, 65/359, 65/360, 65/357, 65/361
[51] Int. Cl............................................. C03b 9/40
[58] Field of Search...................... 65/357, 359, 323, 65/361, 342

[56] References Cited
UNITED STATES PATENTS
3,529,950   9/1970   Brinduse........................... 65/359 X
3,528,796   9/1970   Trahan................................. 65/357
1,764,166   6/1930   Hewitt................................. 65/359
3,617,233   11/1971  Mumford............................. 65/357

*Primary Examiner*—Frank W. Miga
*Attorney*—Robert E. Burns et al.

[57] ABSTRACT

A supporting device for releasably supporting a pair of mold halves upon a mold conveying element comprises a pair of support base members slidable on the mold conveying element and each having releasably mounted thereon one mold half. Each support base member has a recess therein terminating in a pair of ledge portions and each mold half is provided with a mold holding section having a pair of grooves therein engageable with the ledge portions to releasably support the mold upon one support base member. Each mold holding section is provided with an inclined bottom surface and a movable wedge member is provided within each recess and has a similarly inclined upper surface. Means are provided for moving the wedge member into and out of wedging engagement with the inclined bottom surface of the mold holding section to releasably lock the mold holding section of the molds to the mold conveying element whereby the mold halves may be easily removed and exchanged.

10 Claims, 4 Drawing Figures

DEVICE FOR DETACHABLY SUPPORTING GLASS BULB MOLDS

This is a continuation-in-part application of application Ser. No. 839,397 filed July 7, 1969 and now abandoned.

The present invention relates to glass blowing apparatus and more particularly, to a supporting device for detachably mounting and supporting glass bulb-forming molds in a bulb blowing apparatus.

The present invention is especially suitable for glass bulb blowing apparatus of the type known as "ribbon machines" wherein molten glass is delivered from a melting furnace and is formed into a flat ribbon by means of a pair of feed rollers. The flat glass ribbon is horizontally transferred by a plate conveyor between a series of blow heads and a series of cooperating mold devices whereupon the glass ribbon is blown by air under pressure ejected from the blow heads into the desired configuration determined by the mold devices. In this manner, glass bulbs, such as electric lamp bulbs, may be continuously formed.

The molds which are used in the above-mentioned type of "ribbon machines" must often be changed in order to obtain the numerous varieties of glass bulbs which are in commerical use. Moreover, each mold is provided with a paste layer which is applied to the inner surface of the mold for facilitating the formation of the molded article and this paste layer is frequently damaged by the combined effects of the heat of the molten glass and the pressurized air blown into the mold and thus it is necessary to periodically substitute replacement molds for the damaged molds.

It is therefore a primary object of the present invention to provide a simple and inexpensive device for detachably supporting a pair of molds halves in a glass blowing apparatus.

It is another object of the present invention to provide a supporting device for releasably supporting mold halves in such a manner that they may be readily detached or removed from the glass blowing apparatus without the use of tools, such as a spanner or a wrench.

It is a further object of the present invention to provid a supporting device for accurately and releasably positioning mold halves in a glass blowing apparatus whereby the mold halves may be readily removed and exchanged with other mold halves with a minimum of shut-down time of the glass blowing apparatus. provide In order to accomplish the objectives of the present invention, the supporting device comprises a pair of support base members slidably mounted on a mold conveying element and a series of such mold conveying elements are coupled together in a chain formation. Each support base member is provided with a recess terminating in a pair of opposed ledge portions and a wedge member having an inclined planar surface is slidably positioned within the recess. The mold comprises a pair of mold halves each of which is provided at its base portion with a mold holding section. Each mold holding section is provided with a pair of opposed grooves slidable along respective ledge portions of the support base member as well as an inclined bottom surface which is engageable with the wedge member once the mold holding section of the mold is mounted upon the base member. The wedge member is biased into a locking position wherein the inclined surfaces are engaged with each other thereby forcing the ledge portions into engagement with the grooves whereupon the mold halves are releasably and detachably supported upon a mold conveying element.

Other features and advantages of the mold supporting device of the present invention will be more clearly apparent from the following detailed description of a preferred embodiment of the present invention when read in conjunction with the accompanying drawings, wherein like components and parts are designated by like reference numerals throughout the drawings, and in which.

Figure 1:
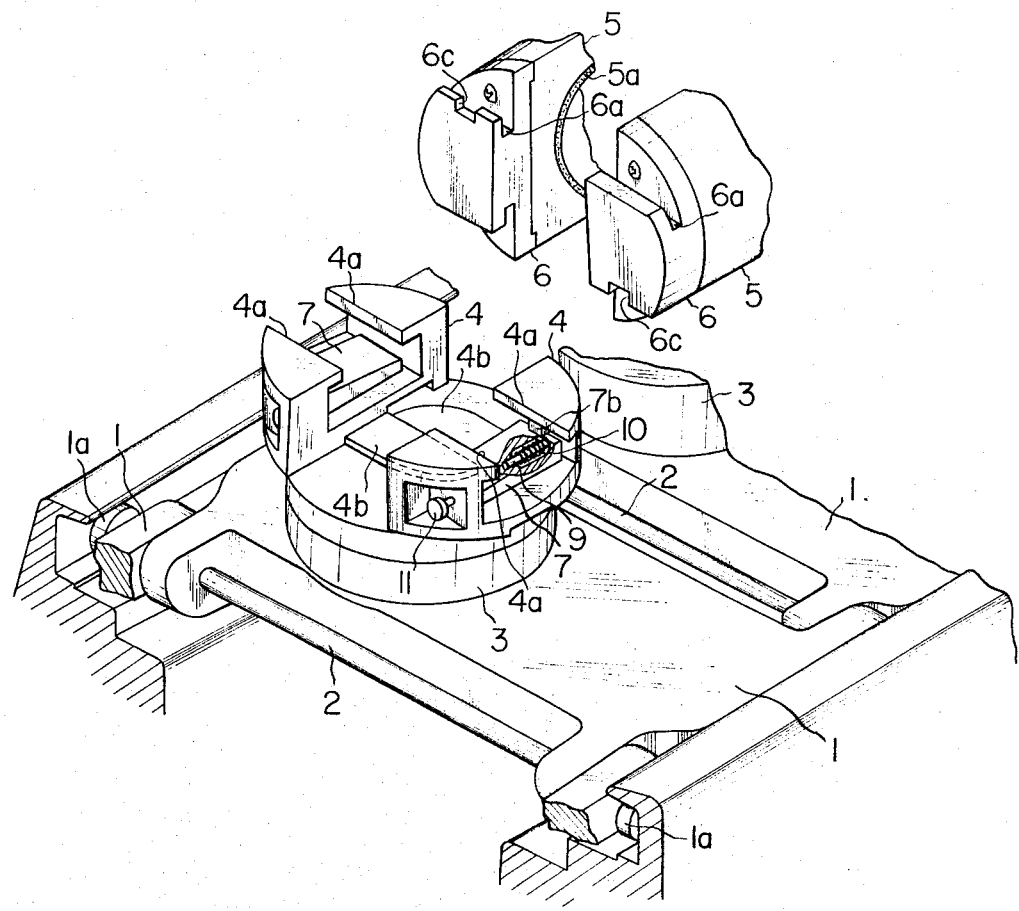
FIG. 1 is a perspective view of the mold supporting device of the present invention showing a pair of mold halves detached from a pair of mold support members.

As seen in FIG. 1, a plurality of mold conveying elements or links 1 are serially connected together by means of pins 2 in the form of a chain belt configuration. A pair of rollers 1a are connected at opposite ends of the pins 2 and these rollers are disposed in guide channels so that the chain belt may be advanced through a ribbon glass bulb-blowing apparatus in synchronism with the advancing speed of a blow-head system, as well known in the art.

Mounted on each of the mold conveying elements 1 is a support structure 3. The support structure 3 is provided with a guideway and a mold supporting device is slidably mounted for movement along the guideway. The mold supporting device comprises a pair of mating support base members 4 each of which has a groove in sliding engagement with the guideway whereby the base members may alternately slide together and apart along an axis defined by the guideway to effect closing and opening of a pair of mold halves 5 when the latter are positioned on the support base members. The mechanism for effecting opening and closing of the base members 4 comprises an arrangement including a pair of horizontal planar members 4b projecting inwardly and integrally from the respective base members 4 in mutual edge-to-edge sliding contact and each having on the lower surface thereof rack teeth in engagement with a driving pinion. Such an arrangement is well known in the art and does not constitute part of the present invention and therefore has been omitted from the drawings.

Each of the mold halves 5 is provided with an opening having the configuration of the desired bulb to be formed by the glass bulb blowing apparatus and a paste lining 5a is provided on the inner surface of the mold. A mold holding section 6 is integrally connected to each mold half 5 and the mold holding section 6 coacts with the base member 4 to detachably mount the mold half upon the support structure 3.

Figure 4:
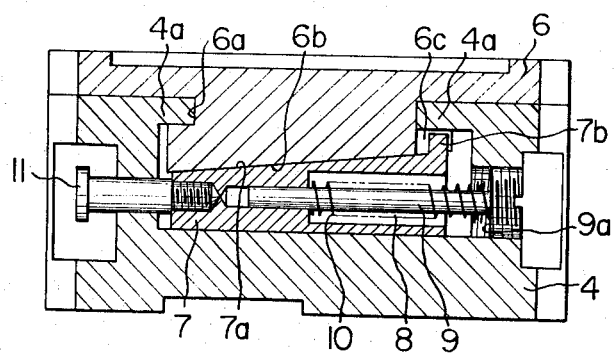
FIG. 4 is a side view of the mold supporting device taken along the line IV—IV in FIG. 3.

As best seen in FIGS. 1 and 4, the slidable base members 4 are each provided with an internal cavity defined at the uppermost portion by a pair of inwardly extending and opposed ledge portions 4a which together define a horizontal guideway for slidably receiving one of the mold holding sections 6. Each mold holding section 6 is provided with a pair of grooves 6a which are configured to slidably receive the ledge portions 4a of one of the base members 4. By such an arrangement, the mold halves 5 are removably mounted upon the base members 4 and the mold halves may undergo sliding movement along an axis defined by the horizontal guideway and which extends generally parallel to the axis along which the base members 4 slide upon the support structure 3.

Figure 3:
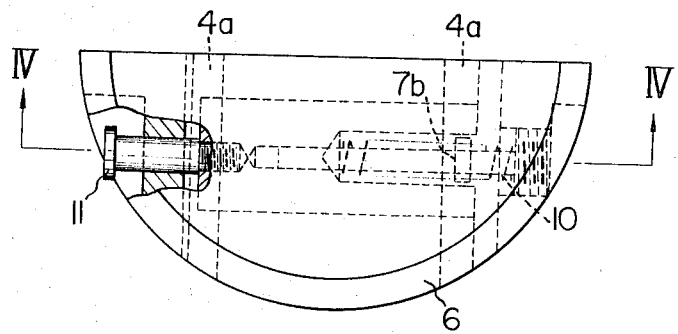
FIG. 3 is a plan view, with a portion cut away and with parts in outline, showing important features of one half of the mold supporting device shown in FIG. 2.

Mounted within each cavity in each of the base members 4 is a slidable wedge member 7. As best seen in FIG. 4, the wedge member 7 has a horizontal bottom surface and an inclined upper planar surface 7a. The wedge member 7 is provided at its thicker end portion with a longitudinally extending stepped bore 8. The stepped bore comprises a pair of coaxial cylindrical bores one of which is larger in diameter than the other. A guide bar 9 has a threaded head portion 9a and as clearly seen in FIG. 4, the head portion 9a is threaded into a tapped hole provided in a side wall of the base member 4 in such a manner that the guide bar 9 extends through he stepped bore 8 in slidable engagement with the smaller of the two cylindrical bores. Biasing means in the form of a compression spring 10 is disposed within the larger of the two cylindrical bores and is positioned between an interior surface portion of the wedge 7 and the head 9a of the guide bar. The compression spring 10 applies a continuous biasing force on the wedge member 7 tending to move same in a leftward direction, as viewed in FIGS. 3 and 4, into a locking position.

Also connected to the wedge member 7 is a release pin 11. The release pin 11 is threaded into the thinner end portion of the wedge member 7 and is also slidable through a wall portion of the base member 4. By such an arrangement, the wedge member 7 is continuously urged in the leftward direction by the biasing means into its locking position and may be moved in a rightward direction against the biasing means to an unlocking position by manually depressing the pin 11. The guide bar 9 ensures that the wedge member 7 undergoes reciprocal movement along a predetermined straight path of travel.

Figure 2:
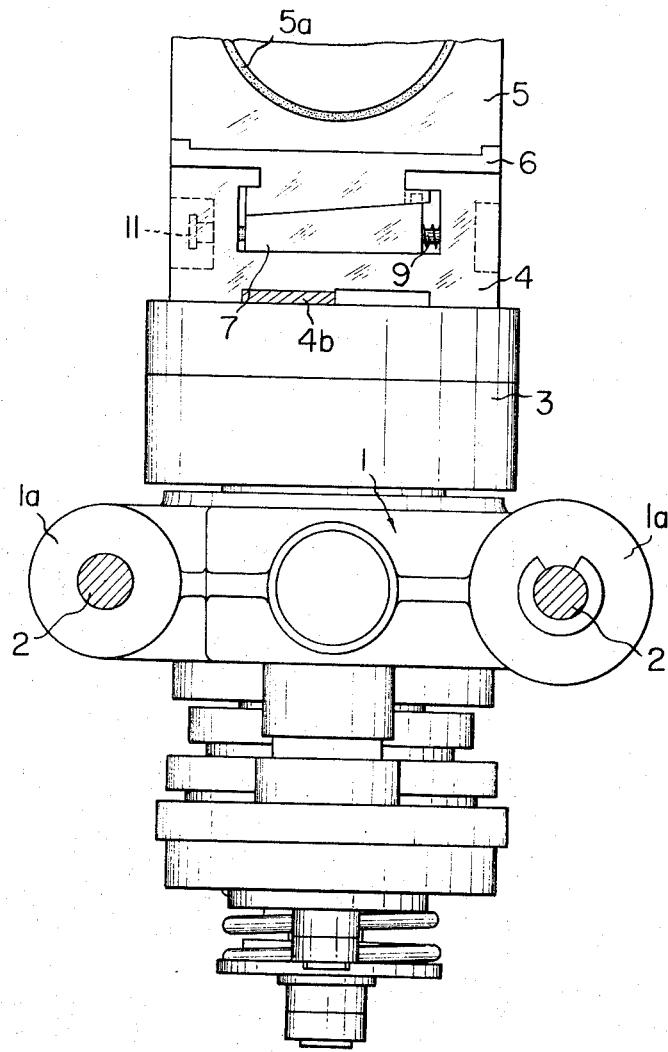
FIG. 2 is a side elevational view, partly in cross-section, showing one mold conveying element of a chain such elements provided with the mold supporting device according to the present invention.

Each of the mold holding sections 6 is provided with an inclined bottom planar surface 6b which complements the inclined planar surface 7a of the wedge member 7. When the mold halves 5 are mounted upon the base member 4 by the sliding engagement of the ledge portions 4a being received within the grooves 6a, the inclined planar surface 6b is configured to releasably engage with the inclined planar surface 7a of the wedge member 7. As seen in FIGS. 2 and 4, the inclined planar surface 6b coacts with the planar bottom surface of the recess to define a wedge-shaped space wherein the wedge member 7 is slidably housed. Of course, in order to mount the mold half 5 upon the base member, the pin 11 must first be manually depressed whereupon the wedge member 7 is moved rightwardly to an unlocking position thereby enabling sufficient clearance for the mold holsing members 6 to engage with the base members 4.

Once the mold halves 5 are suitably mounted atop the respective base members 4, the pins 11 are released whereupon the biasing spring 10 urges the wedge member 7 leftwardly to a locking position wherein the mating inclined surfaces are in releasable engagement. The biasing force applied by the spring 10 is transmitted via the inclined surfaces into an upward component of force which is effective to lock the ledge portions 4a within respectives ones of the grooves 6a. In other words, the biasing force of the spring 10 forces the inclined planar surface 7a of the wedge member 7 against the inclined planar surface 6b of the mold holding section 6 thereby pressing the grooves 6a into releasable locking engagement with the ledges 4a. By such a construction, the mold holding sections 6 are releasably locked to their respective base members 4 and the mold halves may be quickly and simply changed or replaced in a highly efficient manner by merely depressing the release pins 11 and exchanging mold halves.

As most clearly seen in FIGS. 1 and 4, each mold holding section 6 is provided with a cut-out portion 6c adjacent one of the grooves 6a. Each wedge member 7 is provided with a projecting lug 7b dimensioned to fit within and engage with the cut-out portion 6c when the mold holding member 6 is engaged with the wedge member 7.

The mold supporting apparatus of the present invention operates in the following manner. When it is desired to mount a mold 5 upon one of the mold conveying elements 1, the base members 4 are cammed apart to the position shown in FIG. 1. The pin 11 on each base member 4 is depressed inwardly effecting sliding movement of the wedge member 7 against the biasing action of the compression spring 10 to an unlocking position. Then the desired mold half 5 along with its mold holding section 6 is slid into engagement on the base member 4 whereupon the ledge portions 4a of the base member 4 are received within the grooves 6a provided in the mold holding section 6. Then the pin 11 is then released whereupon the biasing spring 10 urges the wedge member 7 back to its locking position along a path of travel dictated by the guide bar 9 whereupon the inclined surface 6a of the mold holding section 6 and the projecting lug 7b of the wedge member 7 moves into engagement with the cut-out portion 6c provided in the mold holding section 6. As seen in FIG. 4, the projecting lug 7b is moved into and out of engagement with the cut-out portion 6c in response to sliding movement of the wedge member 7.

By the apparatus of the present invention, a mold is positively and accurately held in its working position on a support base member 4. Adverse loosening of the mold is thereby prevented and a long servicable life is obtained. In accordance with the present invention, the mold may be readily exchanged merely by depressing the pin 11 which is readily accessible from outside the apparatus.

It will thus be apparent that the mold supporting device of the present invention is capable of detachably supporting a mold and is applicable for various other types of molds aside from molds for forming glass bulbs. The present invention may be practiced with any mold comprising a pair of mold halves which require exchanging, replacing, and/or removal.

What I claim:

1. In a continuously operable glass bulb blowing apparatus having a plurality of mold conveying elements coupled together in a chain formation, each of said mold conveying elements including a supporting device composed of two mating parts each detachably supporting one of a pair of cooperative mold halves of a glass bulb-forming mold, the improvement wherein each of said two mating parts comprises a support base member movable along one axis toward and away from the support base member of the mating part, a mold holding section connected to one mold half, means mounting said mold holding section on said support base member for sliding movement along another axis extending generally parallel to said one axis to enable detachment of said mold holding section from said support base member, means defining a wedge-shaped space between a surface portion of said support base member and a surface portion of said mold holding section, a movable wedge member, and means mounting said wedge member within said wedge-shaped space for movement between a locking position wherein said wedge member is in wedging engagement with said surfaces to releasably lock said mold holding section relative to said support base member and an unlocking position wherein said wedge member is disengaged from said surfaces thereby enabling said mold holding section and the mold half connected thereto to be slid along said another axis relative to said support base member and removed therefrom.

2. The glass bulb blowing apparatus as claimed in claim 1, wherein each said support base member has a pair of opposed ledges defining therebetween a guideway, and wherein each said mold holding section has means therein defining a pair of grooves slidably engaging with respectives ones of said ledges, whereby the mold holding section is slidably held on said support base member.

3. The glass bulb blowing apparatus as claimed in claim 1, wherein said surface portion of said support base comprises a horizontal planar bottom surface of an upwardly opened recess formed in the support base member, and wherein said surface of said mold holding section comprises an inclined planar surface on the bottom of said mold holding section.

4. The glass bulb blowing apparatus as claimed in claim 1, further including a wedge operating member rigidly secured to said wedge member and projecting through said support base member for enabling manual operation of said wedge member from outside the support base member.

5. The glass bulb blowing apparatus as claimed in claim 4, further including biasing means biasing said wedge member toward said locking position.

6. The glass bulb blowing apparatus as claimed in claim 1, further including a lug connected to said wedge member, means defining a cut-out in said mold holding section, and means positioning said lug relative to said cut-out whereby said lug is engaged within said cut-out when said wedge member is in said locking position to prevent angular movement of the mold holding section relative to said support base member and is disengaged from said cut-out when said wedge member is in said unlocking position to allow angular movement of the mold holding section relative to the support base member.

7. The glass bulb blowing apparatus as claimed in claim 1, wherein said means mounting said wedge member within said wedge-shaped space includes a horizontal guide bar extending from said support base member into said wedge member in sliding engagement with the latter.

8. In a continuously operable glass bulb blowing apparatus having a plurality of mold conveying elements coupled together in a chain formation, a pair of mold-supporting base members slidably mounted on respective ones of said mold conveying elements for slidable movement toward and away from each other, two mating mold halves of a glass bulb-forming mold associated with each of said mold conveying elements, and means for detachably supporting the two mold halves on said base members, the improvement wherein each of said means for detachably supporting the mold halves comprises means defining in each base member an upwardly opened recess having a horizontal planar bottom and bounded along two sides by two opposed ledges which extend in the direction of the sliding movement of the base member and define a horizontal guideway, a mold holding section integrally fixed to each mold half and having an inclined planar surface and having means defining two parallel grooves on opposite sides thereof each in slidable engagement with one of said two ledges, and means including a movable wedge member slidably mounted on said horizontal planar bottom of the recess and movable into wedging engagement between said inclined planar surface and said planar bottom to press said mold holding section upwardly with resultant binding engagement between the ledges and the grooves, whereby the mold holding section and hence the mold half thereon may be releasably and integrally locked with said base member.

9. The glass bulb blowing apparatus as claimed in claim 8, further including means for applying a spring force in one direction on each wedge member pressing said mold holding section against said ledges, and release means for moving said wedge member in a direction opposite to said one direction to thereby unlock and release the mold holding section relative to the mold supporting base member.

10. The glass bulb blowing apparatus as claimed in claim 8, further including a lug connected to said wedge member, means defining a cut-out in said mold holding section, and means positioning said lug relative to said cut-out whereby said lug is engaged within said cut-out when said wedge member locks said mold holding section to prevent angular movement of the mold holding section relative to the mold supporting base member and is disengaged from said cut-out when said wedge member unlocks said mold holding section to allow angular movement of said mold holding section relative to said mold supporting base member.

* * * * *